UNITED STATES PATENT OFFICE.

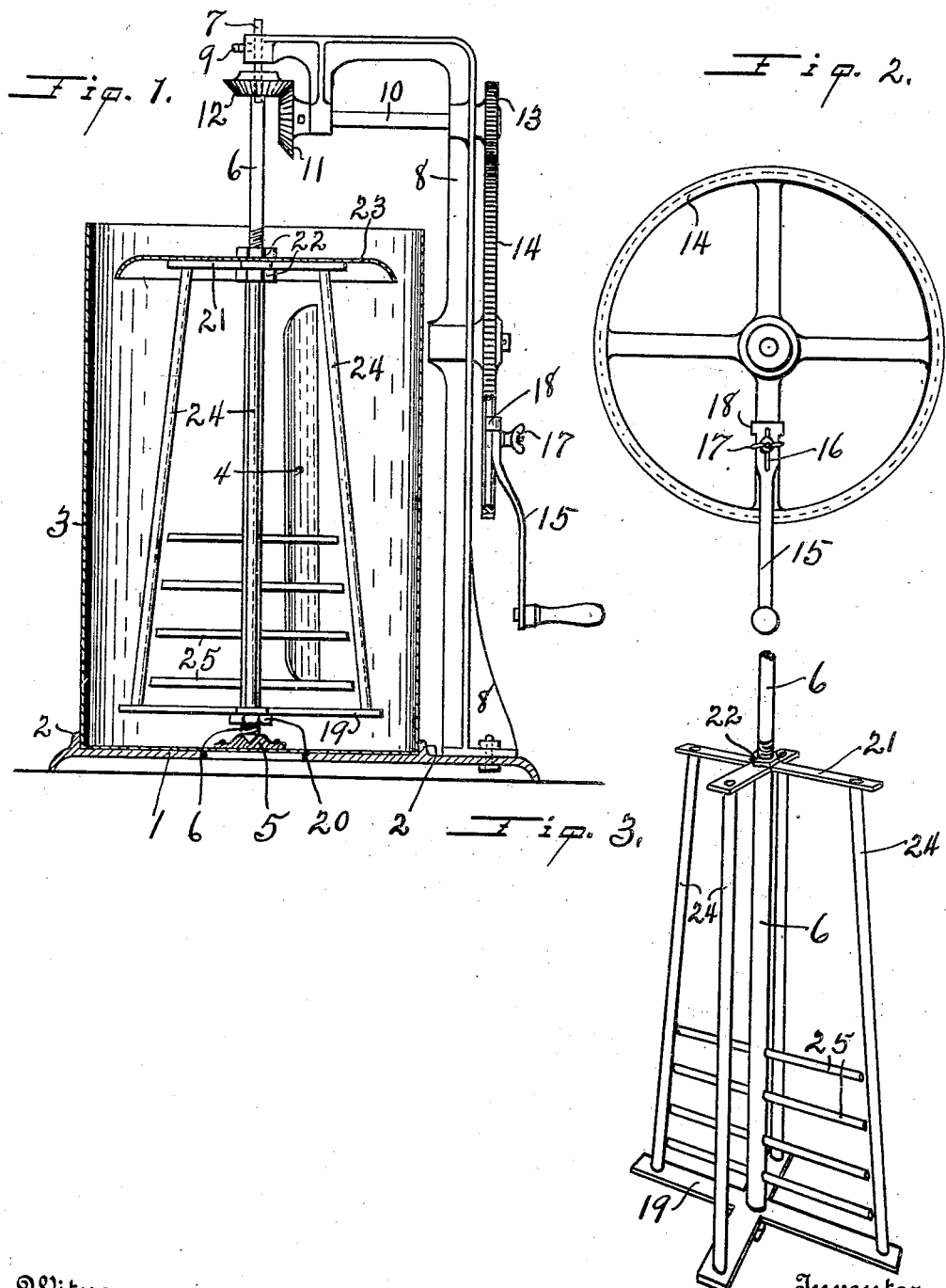

JOHN WILSON, OF STOCKTON, CALIFORNIA.

CHURN.

No. 835,126.  Specification of Letters Patent.  Patented Nov. 6, 1906.

Application filed June 13, 1906. Serial No. 321,541.

*To all whom it may concern:*

Be it known that I, JOHN WILSON, a citizen of the United States, residing at Stockton, in the county of San Joaquin and State of California, have invented a new and useful Churn, of which the following is a specification.

My invention relates to improvements in churns in which a vertical rotating dasher operates in conjunction with a cream-receptacle; and the objects of my invention are, first, to provide a churn that will agitate the cream uniformly throughout its vertical depth; second, which will preserve the grain of the butter intact; third, which will separate the butter from the residue expeditiously, and, lastly, one which may be cheaply constructed and can be easily operated.

I attain these objects by the use of the peculiar construction, novel combination, and adaptation of parts hereinafter described, and particularly pointed out in the claim hereunto annexed, reference being had to the accompanying drawings for a better comprehension thereof, in which—

Figure 1 is a side elevation of my new churn shown partly in section. Fig. 2 is a detached detail view of the main gear-wheel, showing the adjustable operating-handle. Fig. 3 is a detached perspective view of the dasher having the deflecting plate removed.

Similar figures of reference indicate corresponding parts in the several views.

In a base 1, having suitable guides 2 to receive the same, a suitable cream-receptacle 3 is removably located, which is preferably cylindrical in form, as shown, but which may be formed square without departing from the spirit of my invention. This cream-receptacle 3 has one or more stationary wings or stops 4, rigidly attached to and arranged vertically on the sides thereof for the purpose of preventing a circular motion of the cream, as will hereinafter be more fully set forth. In the center of the bottom of the said receptacle 3 I rigidly attach a guide or pivot-bearing 5, into which the lower end of the dasher-rod 6 is adapted to fit. The upper end of the said dasher-rod 6 is secured in position by a pin 7, which fits loosely in a depression in the end of said rod 6 and is secured in an eye in the upper and outer end of a standard or frame 8 by a set-screw 9.

The frame 8 is rigidly secured to the base 1 in a suitable manner and is formed so that its upper end will extend over the cream-receptacle 3 to the center of the same and has the eye to receive the pin 7 aforesaid. The said frame 8 is provided and formed with journal-bearings to receive a horizontal shaft 10, which is adapted to carry a bevel gear-wheel 11 on its inner end, which is adapted to engage a similar gear-wheel 12, rigidly secured to the upper end of the dasher-rod 6. The outer end of said shaft 10 has a spur-pinion 13 rigidly secured thereto, which is adapted to be engaged by a spur gear-wheel 14, which is suitably journaled on a bearing on the frame 8.

I provide the wheel 14 with an adjustable crank-handle 15, which has the slot 16, adapted to be engaged by the thumb-screw 17, which is secured in one of the spokes of the wheel 14. The base of the crank is formed to fit the spoke and has the lips 18 adapted to engage the sides of the spoke for the purpose of maintaining the said crank against side motion.

The dasher-rod 6 has screw-threads on its bottom end to receive a four-armed support 19, which is maintained rigidly thereon by a lock-nut 20. Near the top end of said dasher-rod 6 the same is also provided with screw-threads adapted to receive a support 21 similar to the support 19 between two lock-nuts 22. Between said support 21 and the upper lock-nut 22 a deflecting-plate 23 is inserted with its edges curved downwardly to prevent the cream from being thrown out of the cream-receptacle.

The support 21 has its arms formed shorter than the arms of the support 19, and each alternate arm of each of the supports 19 and 21 are shorter than the remainder of said arms. The short arms of the upper support 21 are arranged above the short arms of the support 19, and the same arrangement is followed with the longer arms.

The arms of the supports 19 and 21 are adapted to receive vertically-inclined rods 24 near their outer ends, as shown in Fig. 1, said rods 24 being of a size sufficient to present a flatly curved or convex surface, in contradistinction to a cutting-surface, to the cream, so as not to cut the grain of the same.

One of the main features of my invention is the general form of the dasher, which is of larger diameter at the bottom than at the top for the purpose of tending to create a greater agitation at the bottom of the cream-receptacle to counterbalance the greater friction, which retards the agitation by reason of the tendency of the cream to adhere to the bottom of the said receptacle, thus making a uniform agitation throughout the entire body of cream.

I arrange the arms of the supports 19 and 21 in different lengths for the purpose of bringing each alternate rod 24 in a different line of travel through the cream, and in the larger sizes of churns I employ straight horizontal arms 25, rigidly secured to the dasher-rod 6 near its bottom end, to secure a more thorough and uniform agitation.

The operation is as follows: The receptacle 3 is filled to about two-thirds full with cream, and the dasher is inserted with the lower end of the rod 6 located in the bearing 5, and the pin 7 inserted and secured in the top end thereof. In this position the bevel gear-wheels 11 and 12 will engage each other, and as the wheel 14 is revolved by means of the handle 15 the dasher is rotated through the cream, which in conjunction with the wings 4 to prevent a gyratory motion of the cream thoroughly agitates the cream uniformly until the butter is separated from the residue.

I am well aware that churns have been constructed wherein minute wires are arranged vertically in the dasher and operate in conjunction with movable or swinging blades. Therefore, this feature I do not claim broadly; but What I do claim as new, and desire to secure by Letters Patent, is—

In a churn of the class described the combination of the cream-receptacle having the wings 4 on the sides and the pivot-bearing in the bottom thereof, the dasher-rod carrying the supports 19 and 21 rigidly secured at suitable points vertically thereon, the deflector 23 secured above the support 21, the rods 24 secured in the supports 19 and 21, the arms 25 secured in the dasher-rod 6, the pin 7 secured in the frame and adapted to engage the upper end of the dasher-rod, the bevel gear-wheels 12 and 11 rigidly attached to the dasher-rod and to the shaft 10, respectively, said shaft 10 journaled in the frame and carrying the spur-pinion 13, the spur-gear 14 journaled on the frame and engaging said pinion 13, the adjustable crank-handle secured to a spoke of the wheel 14, in combination with a suitable frame and base all arranged and operating substantially as shown and described.

In testimony whereof I have signed my name to this specification in the presence of two subscribing witnesses.

JOHN WILSON.

Witnesses:
A. H. CARPENTER,
M. HAYNES.